(12) United States Patent
Tamura et al.

(10) Patent No.: US 11,905,650 B2
(45) Date of Patent: Feb. 20, 2024

(54) WATER REPELLENT OIL REPELLENT AGENT AND METHOD FOR PRODUCING SAME, AND WATER REPELLENT OIL REPELLENT PRODUCT AND METHOD FOR PRODUCING SAME

(71) Applicant: HOKUETSU CORPORATION, Nagaoka (JP)

(72) Inventors: Atsushi Tamura, Nagaoka (JP); Shota Fukushima, Nagaoka (JP); Koji Tanaka, Nagaoka (JP)

(73) Assignee: HOKUETSU CORPORATION, Niigata (JP)

( * ) Notice: Subject to any disclaimer, the term of this patent is extended or adjusted under 35 U.S.C. 154(b) by 829 days.

(21) Appl. No.: 16/961,594

(22) PCT Filed: Jan. 22, 2019

(86) PCT No.: PCT/JP2019/001830
§ 371 (c)(1),
(2) Date: Jul. 10, 2020

(87) PCT Pub. No.: WO2019/151040
PCT Pub. Date: Aug. 8, 2019

(65) Prior Publication Data
US 2020/0370238 A1 Nov. 26, 2020

(30) Foreign Application Priority Data
Feb. 1, 2018 (JP) ................. 2018-016748

(51) Int. Cl.
| | | |
|---|---|---|
| *D06M 15/05* | (2006.01) | |
| *D06M 13/352* | (2006.01) | |
| *D06M 13/395* | (2006.01) | |
| *D06M 13/402* | (2006.01) | |
| *D06M 15/277* | (2006.01) | |
| *D06M 15/295* | (2006.01) | |
| *C09D 7/40* | (2018.01) | |
| *C09D 5/16* | (2006.01) | |
| *C09D 101/02* | (2006.01) | |
| *B82Y 30/00* | (2011.01) | |
| *B82Y 40/00* | (2011.01) | |

(52) U.S. Cl.
CPC .......... *D06M 15/05* (2013.01); *C09D 5/1625* (2013.01); *C09D 5/1687* (2013.01); *C09D 7/70* (2018.01); *C09D 101/02* (2013.01); *D06M 13/352* (2013.01); *D06M 13/395* (2013.01); *D06M 13/402* (2013.01); *D06M 15/277* (2013.01); *D06M 15/295* (2013.01); *B82Y 30/00* (2013.01); *B82Y 40/00* (2013.01); *D06M 2200/11* (2013.01); *D06M 2200/12* (2013.01)

(58) Field of Classification Search
CPC ...... C09D 5/1625; C09D 5/1687; C09D 7/70; C09D 101/02; C09D 175/04; C08G 18/6492; C08G 18/70; C09K 3/18; B82Y 30/00; B82Y 40/00; D06M 15/05; D06M 13/352; D06M 13/395; D06M 13/402; D06M 15/277; D06M 15/295; D06M 2200/11; D06M 2200/12; D06M 23/08; D06M 13/11; D06M 13/35; D06M 13/432; D06M 15/564; D21H 11/18; D21H 11/20; D21H 17/11; D21H 17/72; D21H 21/16

See application file for complete search history.

(56) References Cited

U.S. PATENT DOCUMENTS

| | | |
|---|---|---|
| 2003/0153664 A1 | 8/2003 | Sugimoto et al. |
| 2010/0173085 A1 | 7/2010 | Jariwala et al. |
| 2019/0127557 A1 | 5/2019 | Onogi et al. |

FOREIGN PATENT DOCUMENTS

| | | | |
|---|---|---|---|
| CN | 104844987 | | 8/2015 |
| CN | 105802471 | A * | 7/2016 |
| CN | 106009988 | A * | 10/2016 |
| JP | 2000-169735 | | 6/2000 |
| JP | 2014218579 | A | 11/2014 |
| JP | 2015-025140 | | 2/2015 |
| JP | 2015025140 | A | 2/2015 |
| JP | 2016-113724 | | 6/2016 |
| JP | 2017-124529 | | 7/2017 |
| JP | 2017124529 | A | 7/2017 |
| WO | 2014116941 | | 7/2014 |
| WO | 2015129634 | | 9/2015 |
| WO | WO-2017066119 | A1 * | 4/2017 |
| WO | 2017138574 | | 8/2017 |

OTHER PUBLICATIONS

Japanese Office Action dated Apr. 22, 2022 for Chinese Appl. No. 2019-527578.
International Preliminary Report on Patentability dated Aug. 13, 2020 from corresponding International Patent PCT Application PCT/JP2019/001830, 6 pages.
Chinese Office Action dated Apr. 22, 2022 for Chinese Appl. No. 2019-527578.

(Continued)

*Primary Examiner* — Anthony J Green
(74) *Attorney, Agent, or Firm* — Ohlandt, Greeley and Perle, LLP

(57) ABSTRACT

A water- and oil-repellent agent contains cellulose nanofibers, a compound having at least one functional group of an oxazoline group, a carbodiimide group, an epoxy group and an isocyanate group, as a crosslinking agent, and a perfluoroalkyl compound.

17 Claims, No Drawings

(56) References Cited

OTHER PUBLICATIONS

Extended European Search Report dated Sep. 22, 2021 in corresponding European Patent Application No. 19748044.5, 6 pgs.
Japanese Office Action dated Jun. 4, 2022 for Japanese Appl. No. 2019-527578.
International Search Report dated Feb. 26, 2019 from corresponding International Patent PCT Application PCT/JP2019/001830, 2 pages.

* cited by examiner

WATER REPELLENT OIL REPELLENT AGENT AND METHOD FOR PRODUCING SAME, AND WATER REPELLENT OIL REPELLENT PRODUCT AND METHOD FOR PRODUCING SAME

BACKGROUND

1. Field of the Disclosure

The present disclosure relates to a water- and oil-repellent agent and a method for producing the same, and a water- and oil-repellent product and a method for producing the same.

2. Discussion of the Background Art

A water- and oil-repellent agent is used for the purpose of imparting water repellency and oil repellency to an article. By applying a water- and oil-repellent agent, it is difficult for water or oil to soak into paper, cloth or the like, and a function to prevent dirt from adhering or to easily remove even if dirt adheres may be provided. As such a water- and oil-repellent agent, a water- and oil-repellent agent containing an organic fluorine compound has been proposed (for example, refer to Patent Literature 1).
Patent Literature 1: JP 2000-169735 A The organic fluorine compound used for the water- and oil-repellent agent includes perfluoroalkyl compounds such as perfluorooctanoic acid (PFOA) and perfluorooctanesulfonic acid (PFOS). However, at present, among these perfluoroalkyl compounds, those having a large number of carbon atoms in a perfluoroalkyl group have high persistent property and bioaccumulation, and are feared to be harmful such as generation of off-gas due to heating or the like. The harmfulness is considered to be high when the number of carbon atoms in the perfluoroalkyl group is 8 or more, thus one having a small number of the carbon atoms is required.

Therefore, although a fluorine-based water- and oil-repellent agent having a perfluoroalkyl group having 6 or less carbon atoms has been proposed, it is currently inferior to a fluorine-based water- and oil-repellent agent having a perfluoroalkyl group having 8 or more carbon atoms, regarding properties such as oil resistance and water resistance.

The present disclosure has been made in view of the above problems, and an object of the present disclosure is to provide a water- and oil-repellent agent having excellent water repellency and oil repellency and relatively low concern of harm, a method for producing the same, and a water- and oil-repellent product and a method for producing the same.

SUMMARY

As a result of intensive studies, the present inventors have found that a water- and oil-repellent agent containing cellulose nanofibers, a predetermined crosslinking agent and a perfluoroalkyl compound can solve the above problems, and completed the present disclosure. Specifically, the water- and oil-repellent agent according to the present disclosure contains cellulose nanofibers, a compound having at least one functional group of an oxazoline group, a carbodiimide group, an epoxy group and an isocyanate group, as a crosslinking agent, and a perfluoroalkyl compound.

In addition, in the water- and oil-repellent agent according to the present disclosure, it is preferable that the cellulose nanofiber is a cellulose nanofiber in which a modifying group is not introduced. With such a configuration, compatibility with other ionic components contained in the water- and oil-repellent agent is improved, and the water- and oil-repellent agent with few aggregates can be obtained.

Moreover, in the water- and oil-repellent agent according to the present disclosure, it is preferable that a perfluoroalkyl group of the perfluoroalkyl compound has 6 or less carbon atoms. With such a constitution, the water- and oil-repellent agent having relatively low concern of harm due to persistent property and bioaccumulation, generation of off-gas due to heating or the like can be obtained.

Further, in the water- and oil-repellent agent according to the present disclosure, it is preferable that the perfluoroalkyl compound is a cationic perfluoroalkyl compound. With such a configuration, the water- and oil-repellent agent has more excellent water repellency and oil repellency.

Furthermore, in the water- and oil-repellent agent according to the present disclosure, it is preferable that the content of the crosslinking agent is 10 to 400 parts by mass in terms of solid content based on 100 parts by mass of cellulose nanofibers. The water- and oil-repellent agent has excellent water repellency and oil repellency and stable liquid properties.

In addition, in the water- and oil-repellent agent according to the present disclosure, the content of the perfluoroalkyl compound is preferably 10 to 400 parts by mass in terms of solid content based on 100 parts by mass of cellulose nanofibers. The water- and oil-repellent agent has excellent water repellency and oil repellency and stable liquid properties.

The water- and oil-repellent agent according to the present disclosure includes a form in which the crosslinking agent is a compound having at least one functional group of an oxazoline group, an epoxy group and an isocyanate group.

The water- and oil-repellent agent according to the present disclosure preferably further contains an acrylic compound. It is possible to further improve adhesion to a substrate, hardness imparting, prevention of blocking, or the like.

Moreover, the method for producing a water- and oil-repellent agent according to the present disclosure includes a mixing step of mixing cellulose nanofibers, a compound having at least one functional group of an oxazoline group, a carbodiimide group, an epoxy group and an isocyanate group, as a crosslinking agent, and a perfluoroalkyl compound.

Further, in the method for producing a water- and oil-repellent agent according to the present disclosure, it is preferable that in the mixing step, an aqueous dispersion of cellulose nanofibers containing the cellulose nanofibers is prepared, the aqueous dispersion of cellulose nanofibers is added with the compound having at least one functional group of an oxazoline group, a carbodiimide group, an epoxy group and an isocyanate group, and the perfluoroalkyl compound is subsequently added. With such a production method, generation of aggregates can be suppressed.

Here, in the method for producing a water- and oil-repellent agent according to the present disclosure, it is preferable that the cellulose nanofiber is a cellulose nanofiber derived from thermomechanical pulp. It is easy to apply, impregnate and spray the water- and oil-repellent agent.

Alternatively, in the method for producing a water- and oil-repellent agent according to the present disclosure, it is preferable that the cellulose nanofiber is a cellulose nanofiber derived from wood flour. It is easy to apply, impregnate and spray the water- and oil-repellent agent.

Alternatively, in the method for producing a water- and oil-repellent agent according to the present disclosure, it is preferable that the cellulose nanofiber is a cellulose nanofiber obtained by immersing wood pulp in an aqueous sodium hydroxide solution to be swelled, and then subjecting it to a mechanical defibration treatment. It is easy to apply, impregnate and spray the water- and oil-repellent agent. Here, in the method for producing a water- and oil-repellent agent according to the present disclosure, it is preferable that the wood pulp is a cellulose nanofiber derived from thermomechanical pulp. It is easy to apply, impregnate and spray the water- and oil-repellent agent. Alternatively, in the method for producing a water- and oil-repellent agent according to the present disclosure, it is preferable that the cellulose nanofiber is a cellulose nanofiber derived from wood flour. It is easy to apply, impregnate and spray the water- and oil-repellent agent.

Furthermore, in the method for producing a water- and oil-repellent agent according to the present disclosure, the concentration of cellulose nanofibers in the aqueous dispersion of cellulose nanofibers is preferably 5% by mass or less. It is easy to secure good fluidity as the water- and oil-repellent agent.

The method for producing a water- and oil-repellent product according to the present disclosure includes a step of applying, spraying or impregnating an object such as cloth, non-woven fabric, paper, leather or wood with the water- and oil-repellent agent according to the present disclosure.

The water- and oil-repellent product according to the present disclosure contains a coating layer containing cellulose nanofibers crosslinked by a compound having at least one functional group of an oxazoline group, a carbodiimide group, an epoxy group and an isocyanate group, and a perfluoroalkyl compound, on at least one surface of a substrate having air permeability. The water- and oil-repellent product having excellent air permeability can be obtained.

Advantageous Effects of the Disclosure

According to the present disclosure, it is possible to provide a water- and oil-repellent agent having excellent water repellency and oil repellency, and relatively low risk of harm, and a method for producing the same. Further, it is possible to provide a water- and oil-repellent product having excellent water repellency and oil repellency, and also excellent air permeability, and a method for producing the same.

DETAILED DESCRIPTION OF THE PREFERRED EMBODIMENT

Next, the present disclosure will be described in detail with reference to embodiments, but the present disclosure is not construed as being limited to the description. The embodiments may be variously modified as long as the effects of the present disclosure are exhibited.

In this embodiment, the cellulose nanofiber is a fine cellulose fiber having a number average fiber diameter of 1 to 500 nm. The aspect ratio (number average fiber length/number average fiber diameter) is 100 or more, and the cellulose nanofiber includes a chemically treated (modified) fine cellulose nanofiber. The cellulose nanofiber is, for example, microfibrillated cellulose obtained by shearing and defibrating a cellulose fiber under high pressure, nanofibrinated cellulose, or fine bacterial cellulose produced by microorganisms. The modified cellulose nanofiber is, for example, an ultrafine and fine cellulose fiber having a uniform fiber diameter isolated as a water dispersion by subjecting cellulose nanocrystals obtained by treating natural cellulose with 40% or more concentrated sulfuric acid or microfibrils, which are the smallest unit of fibers constituting wood pulp, to mild chemical treatment and slight mechanical treatment at room temperature and atmospheric pressure. In this embodiment, regarding the fiber diameter of the cellulose nanofiber, the number average fiber diameter is preferably 2 to 30 nm, and more preferably 3 to 20 nm.

The cellulose nanofiber can be obtained by leaving a cellulose raw material unmodified or by subjecting it to chemical treatment (modification), followed by defibration treatment (applying shearing force). In this embodiment, the cellulose raw material is not particularly limited, for example, as wood pulp, chemical pulp such as LBKP (leaf bleached kraft pulp), NBKP (needle bleached kraft pulp), LUKP (leaf unbleached kraft pulp), and NUKP (needle unbleached kraft pulp); and mechanical pulp such as GP (ground wood pulp), PGW (pressurized ground wood pulp), RMP (refiner mechanical pulp), TMP (thermomechanical pulp), CTMP (chemi-thermomechanical pulp), CMP (chemi-mechanical pulp) and CGP (chemi-ground pulp); DIP (deinked pulp) and the like can be used, or as non-wood pulp, kenaf, bagasse, bamboo, cotton and the like can be used. These may be used alone or in a mixture of two or more kinds at any ratio. Further, wood flour obtained by grinding wood can also be used. Among them, mechanical pulp is easily micronized and viscosity of a cellulose nanofiber slurry is relatively low, so that it is a more preferable cellulose raw material, in consideration of coating, impregnation and spraying as a water- and oil-repellent agent. Therefore, in this embodiment, the cellulose nanofiber is preferably a cellulose nanofiber derived from mechanical pulp, and particularly preferably a cellulose nanofiber derived from TMP. Also, wood flour obtained by grinding wood is preferable as well as TMP.

Further, the wood pulp is easily micronized by immersing it in an aqueous sodium hydroxide solution to swell it and then subjecting it to a mechanical defibration treatment. A cellulose nanofiber subjected to the mechanical defibration treatment after swelling with the aqueous sodium hydroxide solution has a relatively low viscosity of the slurry, so that it is a more preferable cellulose nanofiber, in consideration of coating, impregnation and spraying as a water- and oil-repellent agent.

In this embodiment, for example, the wood pulp can be swollen by immersing the wood pulp in the aqueous sodium hydroxide solution for several minutes to several hours. The sodium hydroxide concentration of the slurry obtained by immersing wood pulp in the aqueous sodium hydroxide solution is not particularly limited, but is preferably 0.2 to 12% by mass, preferably 2 to 10% by mass, and more preferably 3 to 8% by mass. In a sodium hydroxide concentration in the slurry of less than 0.2% by mass, defibration of the cellulose raw material is difficult to proceed, and conversely in a concentration exceeding 12% by mass, a relatively high concentration alkaline aqueous solution will be handled, which not only impairs safety, but also requires a lot of time when performing dehydration, washing or neutralization. In addition, even if the concentration exceeds 12% by mass, the defibration treatment time in the mechanical defibration step reaches a ceiling and becomes inefficient. Further, it is expected that the crystal system will be changed from cellulose type I to type II to form cellulose nanofibers with a low elastic modulus, which may cause problems depending on the application. The concentration of the aqueous sodium hydroxide solution before immersing the wood pulp is preferably 0.2 to 15% by mass, and more preferably 0.5 to 12% by mass. The time for immersing the wood pulp in the aqueous sodium hydroxide solution is not particularly limited, but is preferably 1 minute to 24 hours. It is more preferably 5 minutes to 12 hours. It is preferable to perform stirring while immersing the wood pulp in the aqueous sodium hydroxide solution.

In this embodiment, after the wood pulp is swollen, the swollen wood pulp may be dealkalized. As dealkalization step, for example, the wood pulp is dealkalized by (1) washing the swollen wood pulp with water, (2) repeating washing with water and dehydration, (3) neutralization by adding an acid, and (4) after washing with water, neutralizing with an acid, or by selecting and combining two or more of them. For example, it is a combination of (1) and (2), a combination of (1) and (3), a combination of (1) and (4), a combination of (2) and (3), and a combination of (2) and (4), a combination of (3) and (4), a combination of (1), (2) and (3), a combination of (1), (2) and (4), a combination of (1), (3) and (4), a combination of (2), (3) and (4), and a combination of (1), (2), (3) and (4), and the order of each combination may be changed. Here, dealkalization means removing sodium hydroxide adhering to the wood pulp, and includes, for example, washing the wood pulp with a large amount of water. By repeating washing with water and dehydration, sodium hydroxide can be efficiently removed from the wood pulp. Moreover, neutralization by an acid such as a diluted sulfuric acid or a diluted hydrochloric acid may be performed, as necessary. Preferably, the swollen wood pulp is thoroughly washed with water, and neutralized by an acid as necessary, to adjust the pH of the swollen wood pulp slurry to a neutral region (pH 6 to 8). By providing such a dealkalization step, it will be unnecessary to handle a relatively high-concentration alkaline aqueous solution in the subsequent mechanical defibration step, and safety of work will be enhanced. Examples of a washing machine and dehydrator used in the dealkalization step are a double extractor, a triple extractor, a disk thickener, a DD washer, a fall washer, a DNT washer, a PT power thickener, a double wire thickener, a screw press, a twin drum press, a tilt thickener, a valveless filter, and the like, but not limited to a specific model.

As the cellulose nanofiber in this embodiment, a chemically treated (modified) one, that is, a cellulose nanofiber in which a modifying group is introduced can also be used, but it is preferably a cellulose nanofiber in which a modifying group is not introduced. The cellulose nanofiber in which a modifying group is not introduced is a cellulose raw material which has been subjected to a defibration treatment without being modified. As the cellulose nanofiber in which a modifying group is introduced by chemical treatment (modification), one that undergoes TEMPO (2,2,6,6-tetramethylpiperidine-1-oxy radical) oxidation, one that undergoes phosphorylation esterification treatment and the like are known, but in each case, an anionic group is introduced, so that the cellulose nanofiber is significantly negatively charged. This may cause aggregation when mixed with a material having a surface charge. When using the cellulose nanofiber in which a modifying group is introduced by chemical treatment (modification), it is preferable to pay attention to the ionicity of other materials so as not to cause aggregation.

Mechanical defibration is preferable as the defibration treatment, and a grinder method, an aqueous counter collision method, or a homogenizer method can be used. The grinder method includes Supermasscolloider (manufactured by MASUKO SANGYO CO., LTD.), glow mill (manufactured by GLOW ENGINEERING CO., LTD.), and the like. The aqueous counter collision method includes Star Burst (manufactured by SUGINO MACHINE LIMITED). In addition, these mechanical defibration methods may be combined, for example, a grinder method may be followed by an aqueous counter collision method.

The water- and oil-repellent agent of this embodiment contains a compound having one or more functional groups of an oxazoline group, a carbodiimide group, an epoxy group and an isocyanate group. These compounds function as crosslinking agents in a relationship with a cellulose nanofiber. By containing the compound (hereinafter, may be described as a crosslinking agent) having one or more functional groups of an oxazoline group, a carbodiimide group, an epoxy group and an isocyanate group, water repellency and oil repellency can be imparted to a dry coating film of the water- and oil-repellent agent. As the crosslinking agent, a compound having at least one functional group of an oxazoline group, an epoxy group and an isocyanate group is more preferable, and since it is easy to improve both water repellency and oil repellency, a compound having an oxazoline group is more preferable.

The content of the crosslinking agent in the water- and oil-repellent agent of this embodiment is not particularly limited, but is preferably 10 to 400 parts by mass in terms of solid content based on 100 parts by mass of cellulose nanofibers. It is particularly preferably 25 to 100 parts by mass. When it exceeds 400 parts by mass, not only will it be an expensive water- and oil-repellent agent, but also the amount of cellulose nanofibers will be relatively reduced, whereby water repellency and oil repellency of the dry coating film of the water- and oil-repellent agent may decrease. When it is below 10 parts by mass, the dry coating film of the water- and oil-repellent agent tends to be brittle due to insufficient crosslinking of the cellulose nanofibers, and as a result, water repellency and oil repellency may decrease. Liquid properties as the water- and oil-repellent agent may become unstable, and aggregates may be easily formed.

The water- and oil-repellent agent of this embodiment contains a perfluoroalkyl compound. The perfluoroalkyl compound is a type of organic fluorine compound, and typical examples thereof include perfluorooctanoic acid, perfluorooctanesulfonic acid, and the like. It is preferable that the perfluoroalkyl compound is a perfluoroalkyl compound having no acryloyl group.

In this embodiment, as the perfluoroalkyl compound, one having a perfluoroalkyl group having 6 or less carbon atoms is preferably used. By setting the number of carbon atoms in the perfluoroalkyl group to 6 or less, the water- and oil-repellent agent having relatively low concern of harm due to persistent property and bioaccumulation, generation of off-gas due to heating or the like can be obtained. The water- and oil-repellent agent using a perfluoroalkyl compound having 6 or less carbon atoms in the perfluoroalkyl group tends to inferior in both water repellency and oil repellency as compared to the water- and oil-repellent agent using a perfluoroalkyl compound having 8 or more carbon atoms, but according to this embodiment, excellent water repellency and oil repellency can be exhibited as the water- and oil-repellent agent using a perfluoroalkyl compound having 6 or less carbon atoms. The lower limit of the number of carbon atoms of the perfluoroalkyl group is not particularly limited, but is preferably 3 or more, more preferably 4 or more, and further preferably 5 or more. Further, the number of carbon atoms of the perfluoroalkyl group is particularly preferably 6.

In this embodiment, it is preferable that the perfluoroalkyl compound is a cationic perfluoroalkyl compound. The cationic perfluoroalkyl compound efficiently binds to the anionic cellulose nanofibers and improves water repellency and oil repellency.

In this embodiment, the perfluoroalkyl compound is preferably used in combination with an acrylic compound. More preferably, the perfluoroalkyl compound and the acrylic compound are more preferably mixed in advance and then used. The acrylic compound refers to a compound containing an acryloyl group, and examples thereof are acrylic polyol type and acrylic urethane type. Use of an acrylic compound is effective for adhesion to a substrate, hardness imparting, or prevention of blocking, and the like. Here, the perfluoroalkyl compound is represented by C6 fluoroalkyl and C6 fluoroalkylol, but perfluoroalkyl compound:acrylic compound=1:9 to 8:2 is preferable, and 1:9 to 5:5 is more preferable. When the ratio of the acrylic compound is too low, the above-mentioned effect of adhesion to a substrate, hardness imparting, or prevention of blocking will be poor, and when the ratio of the acrylic compound is too high, water and oil repellent performances will not be easily exhibited. This ratio can be calculated from the area ratio of total ion chromatograph.

In the present specification, the acrylic compound contains a fluorine-containing acrylic compound containing a fluorine atom in the chemical formula, and a non-fluorine-containing acrylic compound containing no fluorine atom in the chemical formula. The fluorine-containing acrylic compound is sometimes called a perfluoroacrylate compound.

A material in which the perfluoroalkyl compound and the non-fluorine-containing acrylic compound are mixed in advance includes AG-E060 and AG-E080 (both manufactured by AGC Inc.) and the like. Such a material in which the perfluoroalkyl compound and the non-fluorine-containing acrylic compound are mixed in advance has a good compatibility with a paper substrate having a low Stockigt sizing degree (JIS P 8122: 2004), and when the Stockigt sizing degree is less than 10 seconds, it becomes easy to achieve both water repellency and oil repellency, and when the Stockigt sizing degree is 5 seconds or less, it becomes particularly easy to achieve both water repellency and oil repellency. When using the material in which the perfluoroalkyl compound and the non-fluorine-containing acrylic compound are mixed in advance, it is more preferable to use no-size paper containing no sizing agent as the paper substrate.

On the other hand, there is a mixture of a perfluoroalkyl compound and a fluorine-containing acrylic compound (perfluoroacrylate compound) on the market, but this one has a good compatibility with a paper substrate having a relatively high Stockigt sizing degree, and when the Stockigt sizing degree is 10 seconds or more, it becomes easy to achieve both water repellency and oil repellency.

The content of the perfluoroalkyl compound in the water- and oil-repellent agent of this embodiment is not particularly limited, but is preferably 10 to 400 parts by mass in terms of solid content with based on 100 parts of cellulose nanofibers. It is particularly preferably 25 to 100 parts by mass. When it exceeds 400 parts by mass, not only will it be an expensive water- and oil-repellent agent but also aggregates may be easily formed in the water- and oil-repellent agent. When it is below 10 parts by mass, desired water repellency and oil repellency may not be satisfied.

The method for preparing the water- and oil-repellent agent of this embodiment can be obtained by mixing the cellulose nanofibers, the crosslinking agent, and the perfluoroalkyl compound described above. As an example of the preparation method, a crosslinking agent is added while stirring an aqueous dispersion of cellulose nanofibers in which cellulose nanofibers are dispersed in water, and after sufficiently mixing, a perfluoroalkyl compound is added. By thus preparing, generation of aggregates can be suppressed. From the viewpoint of securing good fluidity as the water- and oil-repellent agent, the concentration of the aqueous dispersion of cellulose nanofibers is preferably set to 5% by mass or less. It is preferably 3% by mass or less. When the concentration of the aqueous dispersion of cellulose nanofibers exceeds 5% by mass, the viscosity of the water- and oil-repellent agent is extremely increased, which may impair coating suitability and spray suitability. The lower limit of the concentration of the aqueous dispersion of cellulose nanofibers is preferably 0.2% by mass, and more preferably 0.5% by mass. The concentration of the aqueous dispersion of cellulose nanofibers of TMP is preferably 3% by mass or less, and more preferably 2% by mass or less. The concentration of the aqueous dispersion of cellulose nanofibers of wood flour is preferably 5% by mass or less, and more preferably 3% by mass or less.

The water- and oil-repellent agent of this embodiment can appropriately contain an auxiliary agent as long as the intended effect is not impaired. Examples thereof are thickeners, viscosity reducing agents, defoamers, surfactants, preservatives, and the like.

The water- and oil-repellent agent of this embodiment can be applied to objects such as cloth, non-woven fabric, paper, leather, and wood, and an application method such as coating, spraying, impregnation and the like can be appropriately used. The drying method after application to the object is not also particularly limited, and water repellency and oil resistance are exhibited by natural drying. In order to obtain desired quality in a short time, heat drying or hot air drying may be performed. Desired water repellency and oil resistance are easily obtained by aging for about one month in the case of natural drying, and about two weeks in the case of heating drying or hot air drying. The solid content concentration of the water- and oil-repellent agent is not also particularly limited and may be appropriately changed depending on the application method and the desired water repellency or oil repellency, and is, for example, about 0.5 to 10.0%.

Further, the water- and oil-repellent agent of this embodiment may be further added with a surfactant. By adding a surfactant, it is possible to enhance permeability to a substrate such as cloth, non-woven fabric, paper, leather or wood, and depending on compatibility with the substrate, it becomes easy to achieve both water repellency and oil repellency. The surfactant is not particularly limited, but a nonionic surfactant such as polyoxyalkylene alkyl ether is preferable. The amount of the surfactant added may be appropriately changed depending on the concentration of the water- and oil-repellent agent, and is, for example, about 0.01 to 3%. When it is added too much, the water repellency and oil repellency may be impaired.

The water- and oil-repellent agent of this embodiment can impart water repellency and oil repellency to a target substrate by applying it to at least one surface of the substrate, but there is a characteristic that it is difficult to impair air permeability of the substrate. Therefore, by providing a coating layer of the water- and oil-repellent agent of this embodiment on at least one surface of the substrate having air permeability, a water- and oil-repellent product having excellent air permeability can be obtained. That is, the water- and oil-repellent product according to this embodiment has a coating layer containing cellulose nanofibers crosslinked by a compound having at least one functional group of an oxazoline group, a carbodiimide group, an epoxy group and an isocyanate group, and a perfluoroalkyl compound, on at least one surface of a substrate having air permeability. Examples of the substrate having air permeability include cloth, non-woven fabric, paper, and the like. In the case of application to cloth or non-woven fabric, for example, clothes, bags and the like can be considered, and in the case of application to paper, food wrapping paper which requires air permeability and the like can be considered. The coating amount of the water- and oil-repellent agent of this embodiment on the substrate may be appropriately changed according to the material of the substrate, but is preferably set to 0.05 to 15 $g/m^2$ in terms of solid content. It is more preferably 0.2 to 10 $g/m^2$. Within such ranges, the substrate is provided with sufficient water repellency and oil repellency, and when the substrate has air permeability, the air permeability is not easily impaired.

The air permeability of the substrate is preferably a Gurley air permeability of 1 to 200 seconds in the case of paper or non-woven fabric. It is more preferably 5 to 50 seconds. By applying the water- and oil-repellent agent of the present disclosure to such a highly air-permeable substrate, a high air-permeable (low air-permeable) water- and oil-repellent product while having high water repellency and oil repellency can be obtained.

When the water- and oil-repellent agent of this embodiment is applied to a paper substrate, paper surface pH of the paper substrate is preferably 5 or more, and more preferably 7 or more. The cause is unknown, but at pH less than 5, water repellency may be difficult to exhibit. As the paper having a paper surface pH of 5 or more, a paper substrate containing calcium carbonate is preferable, and neutral paper is preferable.

The water- and oil-repellent agent of this embodiment can give water repellency and oil repellency to any object by applying it to the object. Therefore, the object to which the water- and oil-repellent agent according to this embodiment is applied can be an object that is less likely to be soiled (easy to remove even if soiled). In addition, the water- and oil-repellent agent of this embodiment has little influence on surface property of the object after application. That is, since glossiness or transparency as in the case of coating with a resin is unlikely to be generated, it is easy to maintain the surface property of the object. By utilizing such characteristics, for example, by applying the water- and oil-repellent agent of this embodiment to wooden furniture, it is possible to obtain wooden furniture provided with antifouling properties without impairing texture of the wood.

As described above, the water- and oil-repellent agent of this embodiment can appropriately contain an auxiliary agent within a range that does not impair the intended effect, but it is preferable not to contain a water-soluble polymer such as starch or polyvinyl alcohol, or a synthetic resin such as a styrene-butadiene copolymer resin. When a large amount of these water-soluble polymers or synthetic resins is contained, a coating film may be formed on the application surface of the object to which the water- and oil-repellent agent has been applied, which may significantly reduce air permeability of the object or may change appearance.

EXAMPLES

Next, the present disclosure will be described more specifically with reference to examples, but the present disclosure is not limited to these examples. Further, "parts" and "%" in the examples represent "parts by mass" and "% by mass", respectively, unless otherwise specified. The number of parts added is a value in terms of solid content.

Example 1

<Production of Cellulose Nanofiber>

LTMP (leaf thermomechanical pulp) was disintegrated with water to give a pulp slurry with a concentration of 2%, which was treated with Supermasscolloider MKCA6-5J type (diameter of grinding wheel plate: 6 inches, manufactured by MASUKO SANGYO CO., LTD.). The abrasive plate and the number of treatments used were E6-46 deep groove for four times and then GC-80 standard for two times. The device was uniformly driven at a rotation speed of 1800 rpm and a peripheral speed of 848 m/min. The obtained aqueous dispersion of cellulose nanofibers had a concentration of 2% by mass and a viscosity of 500 cps as measured by a B-type viscometer (60 rpm, 20° C.)

<Preparation of Water- and Oil-Repellent Agent>

Under stirring the 2% by mass aqueous dispersion of cellulose nanofibers, 50 parts of a crosslinking agent (trade name: EPOCROS K2020E, oxazoline resin, manufactured by NIPPON SHOKUBAI CO., LTD.) was added to 100 parts of cellulose nanofibers, and 50 parts of a perfluoroalkyl compound having 6 carbon atoms (trade name: Asahi Guard AGE-060, cationic fluororesin, manufactured by AGC Inc.) was added to 100 parts of cellulose nanofibers to obtain a water- and oil-repellent agent.

Example 2

A water- and oil-repellent agent was obtained in the same manner as in Example 1 except that the amount of the crosslinking agent added was changed from 50 parts to 10 parts in the preparation of the water- and oil-repellent agent.

Example 3

A water- and oil-repellent agent was obtained in the same manner as in Example 1 except that the amount of the crosslinking agent added was changed from 50 parts to 200 parts in the preparation of the water- and oil-repellent agent.

Example 4

A water- and oil-repellent agent was obtained in the same manner as in Example 1 except that the amount of the perfluoroalkyl compound having 6 carbon atoms added was changed from 50 parts to 10 parts in the preparation of the water- and oil-repellent agent.

Example 5

A water- and oil-repellent agent was obtained in the same manner as in Example 1 except that the amount of the perfluoroalkyl compound having 6 carbon atoms added was changed from 50 parts to 200 parts in the preparation of the water- and oil-repellent agent.

Example 6

A water- and oil-repellent agent was obtained in the same manner as in Example 1 except that the amount of the crosslinking agent added was changed from 50 parts to 10 parts, and the amount of the perfluoroalkyl compound having 6 carbon atoms added was changed from 50 parts to 10 parts in the preparation of the water- and oil-repellent agent.

Example 7

A water- and oil-repellent agent was obtained in the same manner as in Example 1 except that the amount of the crosslinking agent added was changed from 50 parts to 200 parts, and the amount of the perfluoroalkyl compound having 6 carbon atoms added was changed from 50 parts to 200 parts in the preparation of the water- and oil-repellent agent.

Example 8

A water- and oil-repellent agent was obtained in the same manner as in Example 1 except that the crosslinking agent (trade name: EPOCROS K2020E, oxazoline resin, manufactured by NIPPON SHOKUBAI CO., LTD.) was changed to a crosslinking agent (trade name: CR-5L, epoxy resin, manufactured by DIC Corporation) in the preparation of the water- and oil-repellent agent.

Example 9

A water- and oil-repellent agent was obtained in the same manner as in Example 1 except that the perfluoroalkyl compound having 6 carbon atoms (trade name: Asahi Guard AGE-060, cationic fluororesin, manufactured by AGC Inc.) was changed to a perfluoroalkyl compound having 6 carbon atoms (trade name: Asahi Guard AGE-080, cationic fluororesin, manufactured by AGC Inc.) in the preparation of the water- and oil-repellent agent.

Example 10

A water- and oil-repellent agent was obtained in the same manner as in Example 1 except that the cellulose nanofiber was not produced, the 2% by mass aqueous dispersion of cellulose nanofibers was replaced by a 0.5% by mass aqueous dispersion of TEMPO oxidized cellulose nanofibers (trade name: RHEOCRYSTA C-2SP, manufactured by DKS Co. Ltd.) (viscosity at B type viscometer (60 rpm, 20° C.) of 1,800 cps) and the perfluoroalkyl compound having 6 carbon atoms (trade name: Asahi Guard AGE-060, cationic fluororesin, manufactured by AGC Inc.) was changed to a perfluoroalkyl compound having 6 carbon atoms (trade name: Asahi Guard AGE-080, anionic fluororesin, manufactured by AGC Inc.) in the preparation of the water- and oil-repellent agent. The TEMPO oxidized cellulose nanofiber is anion-modified.

Example 11

A water- and oil-repellent agent was obtained in the same manner as in Example 1 except that the crosslinking agent (trade name: EPOCROS K2020E, oxazoline resin, manufactured by NIPPON SHOKUBAI CO., LTD.) was changed to a crosslinking agent (trade name: Carbodilite SV-02, carbodiimide resin, manufactured by Nisshinbo Chemical Inc.) in the preparation of the water- and oil-repellent agent.

Example 12

A water- and oil-repellent agent was obtained in the same manner as in Example 1 except that the crosslinking agent (trade name: EPOCROS K2020E, oxazoline resin, manufactured by NIPPON SHOKUBAI CO., LTD.) was changed to a crosslinking agent (trade name: CR-60N, isocyanate resin, manufactured by DIC Corporation) in the preparation of the water- and oil-repellent agent.

Example 13

<Production of Cellulose Nanofiber>

LBKP (leaf bleached kraft pulp) was immersed in an aqueous sodium hydroxide solution, a pulp slurry was adjusted so as to have a LBKP concentration of 3% and an aqueous sodium hydroxide solution concentration of 8.0%, and disintegrated with a standard disintegrator for 10 minutes. Three hours after the LBKP was immersed in the aqueous sodium hydroxide solution, the immersed pulp was washed with tap water using a 100-mesh sieve until neutral and dealkalized. The dealkalized LBKP was disintegrated with water to give a pulp slurry with a concentration of 2%, and treated with Supermasscolloider MKCA6-5J type (diameter of grinding wheel plate: 6 inches, manufactured by MASUKO SANGYO CO., LTD.). The obtained aqueous dispersion of cellulose nanofibers had a concentration of 2% by mass and a viscosity of 800 cps as measured by a B-type viscometer (60 rpm, 20° C.)

<Preparation of Water- and Oil-Repellent Agent>

While stirring the 2% by mass aqueous dispersion of cellulose nanofibers, 50 parts of a crosslinking agent (trade name: EPOCROS K2020E, oxazoline resin, manufactured by NIPPON SHOKUBAI CO., LTD.) was added to 100 parts of cellulose nanofibers, and 50 parts of a perfluoroalkyl compound having 6 carbon atoms (trade name: Asahi Guard AGE-060, cationic fluororesin, manufactured by AGC Inc.) was added to 100 parts of cellulose nanofibers to obtain a water- and oil-repellent agent.

Example 14

A water- and oil-repellent agent was obtained in the same manner as in Example 13 except that the LBKP (leaf bleached kraft pulp) was changed to NUKP (needle unbleached kraft pulp) in the production of cellulose nanofibers.

Example 15

A water- and oil-repellent agent was obtained in the same manner as in Example 13 except that the LBKP (leaf bleached kraft pulp) was changed to LTMP (leaf thermomechanical pulp) in the production of cellulose nanofibers.

Example 16

A water- and oil-repellent agent was obtained in the same manner as in Example 13 except that the LBKP (leaf bleached kraft pulp) was changed to NBKP (needle bleached kraft pulp) in the production of cellulose nanofibers.

Example 17

A water- and oil-repellent agent was obtained in the same manner as in Example 1 except that the LTMP (leaf thermomechanical pulp) was changed to cedar wood flour (40 mesh pass product, product of Toyama western forestry cooperative) in the production of cellulose nanofibers.

Example 18

A water- and oil-repellent agent was obtained in the same manner as in Example 13 except that the LBKP (leaf bleached kraft pulp) was changed to cedar wood flour (40 mesh pass product, product of Toyama western forestry cooperative) in the production of cellulose nanofibers.

Example 19

In the production of the cellulose nanofibers of Example 1, the LTMP (leaf thermomechanical pulp) was changed to LBKP (leaf bleached kraft pulp). The obtained aqueous dispersion of cellulose nanofibers had a concentration of 2% by mass and a viscosity of 7,000 cps as measured by a B-type viscometer (60 rpm, 20° C.) Therefore, this aqueous dispersion was diluted with water to a concentration of 1% by mass to have a viscosity of 1,000 cps. Then, a water- and oil-repellent agent was prepared under stirring the aqueous dispersion. Thus, the water- and oil-repellent agent with a concentration of 1% by mass was obtained in the same manner as in Example 1 except for the matters described above.

Comparative Example 1

50 Parts of a crosslinking agent (trade name: EPOCROS K2020E, oxazoline resin, manufactured by NIPPON SHOKUBAI CO., LTD.) and 50 parts of a perfluoroalkyl compound having 6 carbon atoms (trade name: Asahi Guard AGE-060, cationic fluororesin, manufactured by AGC Inc.) were added into water and mixed to obtain a water- and oil-repellent agent with a concentration of 2% by mass.

Comparative Example 2

A water- and oil-repellent agent was obtained in the same manner as in Example 1 except that the crosslinking agent was not added in the preparation of the water- and oil-repellent agent.

Comparative Example 3

A water- and oil-repellent agent was obtained in the same manner as in Example 1 except that the perfluoroalkyl compound having 6 carbon atoms was not added in the preparation of the water- and oil-repellent agent.

Comparative Example 4

A perfluoroalkyl compound having 6 carbon atoms (trade name: Asahi Guard AGE-060, cationic fluororesin, manufactured by AGC Inc.) was added into water to give a water- and oil-repellent agent with a concentration of 1% by mass.

The water- and oil-repellent agents obtained in Examples 1 to 19 and Comparative Examples 1 to 4 were evaluated as follows. The results are shown in Table 1. Also, the evaluation methods are shown below.

<Application of Water- and Oil-Repellent Agent to Paper Substrate>

30 Parts of NBKP (needle bleached kraft pulp) and 70 parts of LBKP (leaf bleached kraft pulp) were dispersed in water and beaten with a beater to a Canadian Standard Freeness (CSF) of 400 ml to obtain a pulp slurry. To this pulp slurry were added 0.3 parts of polyamide epichlorohydrin (trade name: WS-4020, manufactured by SEIKO PMC CORPORATION) and 0.5 parts of sulfuric acid band, and paper was made with a Fourdrinier machine to obtain a paper substrate having a basis weight of 157 g/m$^2$, and an Oken-type air permeability of 30 seconds. In addition, this paper substrate is a non-size paper to which a sizing agent is not added. The paper substrate had a Stockigt sizing degree of 0 second. The water- and oil-repellent agents obtained in Examples 1 to 18 and Comparative Examples 1 to 4 were impregnated and applied to this paper substrate so that the adhesion amount was 1 g/m$^2$ in terms of solid content (in Table 1, the total amount of CNF adhesion amount, crosslinking agent adhesion amount, and water repellent adhesion amount.) with an impregnating roll and dried with hot air using a dryer to obtain a sample for evaluation. The water- and oil-repellent agent obtained in Example 19 was impregnated and applied with the impregnating roll so that the adhesion amount was 2 g/m$^2$ in terms of solid content.

Example 20

A water- and oil-repellent agent was obtained in the same manner as in Example 1 except that the perfluoroalkyl compound having 6 carbon atoms (trade name: Asahi Guard AGE-060, cationic fluororesin, manufactured by AGC Inc.) was changed to a perfluoroalkyl compound having 6 carbon atoms (Unidyne TG-8811, manufactured by DAIKIN INDUSTRIES, LTD.) in the preparation of the water- and oil-repellent agent.

Example 21

A water- and oil-repellent agent was obtained in the same manner as in Example 20 except that the amount of the crosslinking agent added was changed from 50 parts to 10 parts, and the amount of the perfluoroalkyl compound having 6 carbon atoms added was changed from 50 parts to 10 parts in the preparation of the water- and oil-repellent agent.

Comparative Example 5

A perfluoroalkyl compound having 6 carbon atoms (trade name: Unidyne TG-8811, manufactured by DAIKIN INDUSTRIES, LTD.) was added into water to give a water- and oil-repellent agent with a concentration of 1% by mass.

<Application of Water- and Oil-Repellent Agent to Paper Substrate>

30 Parts of NBKP (needle bleached kraft pulp) and 70 parts of LBKP (leaf bleached kraft pulp) were dispersed in water and beaten with a beater to a Canadian Standard Freeness (CSF) of 400 ml to obtain a pulp slurry. To this pulp slurry were added 0.2 parts of a sizing agent (CC167: manufactured by SEIKO PMC CORPORATION), 0.3 parts of polyamide epichlorohydrin (trade name: WS-4020, manufactured by SEIKO PMC CORPORATION) and 0.5 parts of sulfuric acid band, and paper was made with a Fourdrinier machine to obtain a paper substrate having a basis weight of 157 g/m$^2$, and an Oken-type air permeability of 30 seconds. The paper substrate had a Stockigt sizing degree of 50 seconds. The water- and oil-repellent agents obtained in Examples 20 to 21 and Comparative Example 5 were impregnated and applied to this paper substrate so that the adhesion amount was 1 g/m$^2$ in terms of solid content (in Table 1, the total amount of CNF adhesion amount, crosslinking agent adhesion amount, and water repellent adhesion amount.) with an impregnating roll and dried with hot air using a dryer to obtain a sample for evaluation.

<Water Repellency Evaluation>

Water repellency of each evaluation sample was measured in accordance with JAPAN TAPPI Paper Pulp Test Method No. 68: 2000 "Paper and paperboard—water repellency test method." The measurement results are represented by R0 to R10, and the larger the numerical value, the higher the water repellency.

<Oil Resistance Evaluation>

Oil resistance of each evaluation sample was measured according to TAPPI UM 557 "Repellency of Paper and Board to Grease, Oil, and Waxes (Kit Test)." The measurement result is represented by a grade, and the larger grade (the larger numerical value), the higher the oil resistance (oil repellency).

<Air Permeability>

Air permeability was measured by Oken-type tester method in accordance with JIS P 8117: 2009 "Paper and board—Determination of air permeance and air resistance (medium range)—Gurley method".

| | CNF | CNF Concentration of CNF aqueous dispersion % by mass | CNF Compounding amount Parts by mass | Crosslinking agent | Crosslinking agent compounding amount Parts by mass | Perfluoroalkyl compound (Perfluoroalkyl group having 6 carbon atoms) |
|---|---|---|---|---|---|---|
| Example1 | Produced from LTMP | 2 | 100 | Oxazoline resin | 50 | Cationic fluororesin |
| Example2 | Produced from LTMP | 2 | 100 | Oxazoline resin | 10 | Cationic fluororesin |
| Example3 | Produced from LTMP | 2 | 100 | Oxazoline resin | 200 | Cationic fluororesin |
| Example4 | Produced from LTMP | 2 | 100 | Oxazoline resin | 50 | Cationic fluororesin |
| Example5 | Produced from LTMP | 2 | 100 | Oxazoline resin | 50 | Cationic fluororesin |
| Example6 | Produced from LTMP | 2 | 100 | Oxazoline resin | 10 | Cationic fluororesin |
| Example7 | Produced from LTMP | 2 | 100 | Oxazoline resin | 200 | Cationic fluororesin |
| Example8 | Produced from LTMP | 2 | 100 | Epoxy resin | 50 | Cationic fluororesin |
| Example9 | Produced from LTMP | 2 | 100 | Oxazoline resin | 50 | Anionic fluororesin |
| Example10 | TEMPO oxidized cellulose nanofibers used for CNF | TEMPO oxidized CNF concentration 0.5 | 100 | Oxazoline resin | 50 | Anionic fluororesin |
| Example11 | Produced from LTMP | 2 | 100 | Carbodiimide resin | 50 | Cationic fluororesin |
| Example12 | Produced from LTMP | 2 | 100 | Isocyanate resin | 50 | Cationic fluororesin |
| Example13 | Produced from LBKP (NaOH immersion) | 2 | 100 | Oxazoline resin | 50 | Cationic fluororesin |
| Example14 | Produced from NUKP (NaOH immersion) | 2 | 100 | Oxazoline resin | 50 | Cationic fluororesin |
| Example15 | Produced from LTMP (NaOH immersion) | 2 | 100 | Oxazoline resin | 50 | Cationic fluororesin |
| Example16 | Produced from NUKP (NaOH immersion) | 2 | 100 | Oxazoline resin | 50 | Cationic fluororesin |
| Example17 | Produced from wood flour | 2 | 100 | Oxazoline resin | 50 | Cationic fluororesin |
| Example18 | Produced from wood flour (NaOH immersion) | 2 | 100 | Oxazoline resin | 50 | Cationic fluororesin |
| Example19 | Produced from LBKP | 1 | 100 | Oxazoline resin | 50 | Cationic fluororesin |
| Example20 | Produced from LTMP | 2 | 100 | Oxazoline resin | 50 | Cationic fluororesin |
| Example21 | Produced from LTMP | 2 | 100 | Oxazoline resin | 10 | Cationic fluororesin |
| Comparative Example1 | Not added | 0 | 0 | Oxazoline resin | 50 | Cationic fluororesin |
| Comparative Example2 | Produced from LTMP | 2 | 100 | Not added | 0 | Cationic fluororesin |
| Comparative Example3 | Produced from LTMP | 2 | 100 | Oxazoline resin | 50 | Not added |
| Comparative Example4 | Not added | 0 | 0 | Not added | 0 | Cationic fluororesin |
| Comparative Example5 | Not added | 0 | 0 | Not added | 0 | Cationic fluororesin |

| | Water repellent compounding amount Parts by mass | CNF adhesion amount g/ml | Crosslinking agent adhesion amount g/ml | Water repellent adhesion amount g/ml | Water repellency | Oil resistance | Air permeability |
|---|---|---|---|---|---|---|---|
| Example1 | 50 | 0.50 | 0.25 | 0.25 | R9 | 8 | 152 |
| Example2 | 50 | 0.63 | 0.06 | 0.31 | R7 | 7 | 164 |
| Example3 | 50 | 0.29 | 0.57 | 0.14 | R8 | 8 | 155 |
| Example4 | 10 | 0.63 | 0.31 | 0.06 | R6 | 6 | 169 |
| Example5 | 200 | 0.29 | 0.14 | 0.57 | R9 | 9 | 100 |
| Example6 | 10 | 0.84 | 0.08 | 0.08 | R6 | 5 | 181 |

-continued

| | | | | | | | |
|---|---|---|---|---|---|---|---|
| Example7 | 200 | 0.20 | 0.40 | 0.40 | R9 | 9 | 133 |
| Example8 | 50 | 0.50 | 0.25 | 0.25 | R6 | 6 | 134 |
| Example9 | 50 | 0.50 | 0.25 | 0.25 | R6 | 6 | 144 |
| Example10 | 50 | 0.50 | 0.25 | 0.25 | R6 | 6 | 156 |
| Example11 | 50 | 0.50 | 0.25 | 0.25 | R6 | 6 | 127 |
| Example12 | 50 | 0.50 | 0.25 | 0.25 | R6 | 6 | 81 |
| Example13 | 50 | 0.50 | 0.25 | 0.25 | R8 | 7 | 82 |
| Example14 | 50 | 0.50 | 0.25 | 0.25 | R8 | 7 | 81 |
| Example15 | 50 | 0.50 | 0.25 | 0.25 | R9 | 8 | 126 |
| Example16 | 50 | 0.50 | 0.25 | 0.25 | R8 | 7 | 80 |
| Example17 | 50 | 0.50 | 0.25 | 0.25 | R9 | 8 | 148 |
| Example18 | 50 | 0.50 | 0.25 | 0.25 | R8 | 7 | 121 |
| Example19 | 50 | 1.00 | 0.50 | 0.50 | R6 | 6 | 201 |
| Example20 | 50 | 0.50 | 0.25 | 0.25 | R4 | 9 | 172 |
| Example21 | 10 | 0.84 | 0.08 | 0.08 | R4 | 6 | 191 |
| Comparative Example1 | 50 | 0.00 | 0.50 | 0.50 | R2 | 2 | 30 |
| Comparative Example2 | 50 | 0.07 | 0.00 | 0.33 | R2 | 2 | 148 |
| Comparative Example3 | 0 | 0.67 | 0.33 | 0.00 | R0 | 2 | 206 |
| Comparative Example4 | 50 | 0.00 | 0.00 | 1.00 | R2 | 4 | 30 |
| Comparative Example5 | 50 | 0.00 | 0.00 | 1.00 | R0 | 5 | 56 |

CNF: Cellulose nanofiber
LTMP: Leaf thermomechanical pulp
LBKP: Leaf bleached kraft pulp The results of Table 1 show the following. Examples 1 to 21 were improved in water repellency and oil resistance. On the other hand, Comparative Examples 1 to 5 were inferior in water repellency and oil resistance. From these, it was found that the water repellency and the oil resistance were improved by combining the cellulose nanofibers, the crosslinking agent, and the water repellent.

Comparing Example 1 and Example 15, it was found that even when caustic treatment was performed on the LTMP, the viscosity was originally low, and therefore the effect remained good and unchanged. The viscosity of LBKP used in Example 13, NUKP used in Example 14 and NBKP used in Example 16 was close (lowered) to the viscosity of LTMP by performing caustic treatment, coatability was improved, and performance also improved. Comparing Example 19 and Example 13, in Example 19 where an aqueous dispersion of cellulose nanofibers was prepared using a non-caustic product of LBKP, the CNF concentration is set lower than that in Example 13 (Example 13: 2% by mass, Example 19: 1% by mass), and the adhesion amount of the water- and oil-repellent agent is set larger than that in Example 13 (Example 13: 1 g/m$^2$, Example 19: 2 g/m$^2$), whereby the water repellency and oil resistance are close to the performance of Example 13. As described above, in Example 13, since a caustic product of LBKP was used, water repellency and oil resistance could be improved even if the adhesion amount of the water- and oil-repellent agent was small.

Comparing Example 1 and Example 9, it was found that even better results can be obtained in Example 1 using the cationic fluororesin than in Example 9 using the anionic fluororesin.

TEMPO.CNF has a strong anionic property, and when a cationic fluororesin is used, the coating liquid will aggregate strongly and coating will not be possible. However, as in Example 10, any anionic fluororesin can be used, and results close to Example 9 can be obtained.

Using the epoxy resin in Example 8, using the epoxy resin in Example 11, and using the isocyanate resin in Example 12, good results have been obtained, but it was found that even better results can be obtained in Example 1 using the oxazoline resin. It is inferred that the oxazoline resin has an excellent crosslinking effect on CNF.

What is claimed is:

1. A water- and oil-repellent agent comprising:
   cellulose nanofibers;
   a compound having at least one functional group of an oxazoline group, a carbodiimide group, an epoxy group and an isocyanate group, as a crosslinking agent; and
   a perfluoroalkyl compound,
   wherein a perfluoroalkyl group of the perfluoroalkyl compound has 6 or less carbon atoms.

2. The water- and oil-repellent agent according to claim 1, wherein the cellulose nanofiber is a cellulose nanofiber in which a modifying group is not introduced.

3. The water- and oil-repellent agent according to claim 1, wherein the perfluoroalkyl compound is a cationic perfluoroalkyl compound.

4. The water- and oil-repellent agent according to claim 1, wherein the content of the crosslinking agent is 10 to 400 parts by mass in terms of solid content based on 100 parts by mass of cellulose nanofibers.

5. The water- and oil-repellent agent according to claim 1, wherein the content of the perfluoroalkyl compound is 10 to 400 parts by mass in terms of solid content based on 100 parts by mass of cellulose nanofiber.

6. The water- and oil-repellent agent according to claim 1, wherein the crosslinking agent is a compound having at least one functional group of an oxazoline group, an epoxy group and an isocyanate group.

7. The water- and oil-repellent agent according to claim 1, further comprising an acrylic compound.

8. A method for producing a water- and oil-repellent product, comprising a step of applying, spraying or impregnating an object made of cloth, non-woven fabric, paper, leather or wood with the water- and oil-repellent agent according to claim 1.

9. A method for producing a water- and oil-repellent agent, comprising a mixing step of mixing cellulose nanofibers,
a compound having at least one functional group of an oxazoline group, a carbodiimide group, an epoxy group and an isocyanate group, as a crosslinking agent, and
a perfluoroalkyl compound,
wherein a perfluoroalkyl group of the perfluoroalkyl compound has 6 or less carbon atoms.

10. The method for producing a water- and oil-repellent agent according to claim 9, wherein,
in the mixing step,
an aqueous dispersion of cellulose nanofibers containing the cellulose nanofibers is prepared,
the aqueous dispersion of cellulose nanofibers is added with the compound having at least one functional group of an oxazoline group, a carbodiimide group, an epoxy group and an isocyanate group, and
the perfluoroalkyl compound is subsequently added.

11. The method for producing a water- and oil-repellent agent according to claim 9, wherein the cellulose nanofiber is a cellulose nanofiber derived from thermomechanical pulp.

12. The method for producing a water- and oil-repellent agent according to claim 9, wherein the cellulose nanofiber is a cellulose nanofiber derived from wood flour.

13. The method for producing a water- and oil-repellent agent according to claim 9, wherein the cellulose nanofiber is a cellulose nanofiber obtained by immersing wood pulp in an aqueous sodium hydroxide solution to be swelled, and then subjecting it to a mechanical defibration treatment.

14. The method for producing a water- and oil-repellent agent according to claim 13, wherein the wood pulp is a cellulose nanofiber derived from thermomechanical pulp.

15. The method for producing a water- and oil-repellent agent according to claim 13, wherein the cellulose nanofiber is a cellulose nanofiber derived from wood flour.

16. The method for producing a water- and oil-repellent agent according to claim 10, wherein the concentration of cellulose nanofibers in the aqueous dispersion of cellulose nanofibers is 5% by mass or less.

17. A water- and oil-repellent product comprising a coating layer containing cellulose nanofibers crosslinked by a compound having at least one functional group of an oxazoline group, a carbodiimide group, an epoxy group and an isocyanate group, and a perfluoroalkyl compound, on at least one surface of a substrate having air permeability, wherein a perfluoroalkyl group of the perfluoroalkyl compound has 6 or less carbon atoms.

* * * * *